(12) United States Patent
Sarkis, Sr.

(10) Patent No.: US 11,105,533 B2
(45) Date of Patent: Aug. 31, 2021

(54) HOT WATER HEATING SYSTEMS AND RELATED METHODS

(71) Applicant: Anthony Michael Sarkis, Sr., North Adams, MA (US)

(72) Inventor: Anthony Michael Sarkis, Sr., North Adams, MA (US)

( * ) Notice: Subject to any disclaimer, the term of this patent is extended or adjusted under 35 U.S.C. 154(b) by 0 days.

(21) Appl. No.: 16/368,003

(22) Filed: Mar. 28, 2019

(65) Prior Publication Data

US 2019/0219303 A1 Jul. 18, 2019

Related U.S. Application Data

(63) Continuation of application No. 15/894,097, filed on Feb. 12, 2018, now Pat. No. 10,288,314, which is a
(Continued)

(51) Int. Cl.
*F24D 11/00* (2006.01)
*F24H 6/00* (2006.01)
(Continued)

(52) U.S. Cl.
CPC .................. *F24H 6/00* (2013.01); *F24D 3/02* (2013.01); *F24D 3/04* (2013.01); *F24D 3/18* (2013.01);
(Continued)

(58) Field of Classification Search
CPC ......... F24H 6/00; F24D 3/02; B60H 1/00271; B60H 1/00985; B60H 1/22; B60H 21/02
See application file for complete search history.

(56) References Cited

U.S. PATENT DOCUMENTS 3,767,894 A 10/1973 Berger
4,098,092 A 7/1978 Singh
(Continued)

FOREIGN PATENT DOCUMENTS

CN 101344310 1/2009
CN 102042713 5/2011
(Continued)

OTHER PUBLICATIONS

Hidehiko, Heat pump type water heater, 2012, Full Document (Year: 2012).*
(Continued)

*Primary Examiner* — Elizabeth J Martin
*Assistant Examiner* — Nael N Babaa
(74) *Attorney, Agent, or Firm* — Heslin Rothenberg Farley & Mesiti P.C.; Kristian E. Ziegler, Esq.

(57) ABSTRACT

The present disclosure provides hot water heating systems and methods for heating the atmosphere within a predefined area. The systems include a hybrid water heating and storage apparatus configured to heat and store water including a heat pump and an electric heating tank. The systems include a recirculating pump configured to selectively draw a hot output flow of heated water from the electric heating tank, pass the heated water through a heat exchange fixture to heat the atmosphere within a predefined area, and direct the water back to the electric heating tank from the heat exchange fixture as a cold input flow. The systems further include thermostat electrically coupled to the recirculating pump and positioned within the predefined area configured to sense the temperature of the atmosphere within the first predefined area and selective operate of the recirculating pump based on a sensed temperature and a user selected temperature.

13 Claims, 5 Drawing Sheets

Related U.S. Application Data continuation-in-part of application No. PCT/US2016/046917, filed on Aug. 12, 2016.

(60) Provisional application No. 62/204,182, filed on Aug. 12, 2015.

(51) Int. Cl.

| | | |
|---|---|---|
| *F24D 3/02* | (2006.01) | |
| *F24D 11/02* | (2006.01) | |
| *F24D 3/04* | (2006.01) | |
| *F24D 3/18* | (2006.01) | |
| *F24H 9/20* | (2006.01) | |
| *F24H 1/18* | (2006.01) | |
| *F24H 4/04* | (2006.01) | |
| *F24D 3/10* | (2006.01) | |

(52) U.S. Cl.
CPC ........ *F24D 11/004* (2013.01); *F24D 11/0228* (2013.01); *F24H 1/185* (2013.01); *F24H 4/04* (2013.01); *F24H 9/2007* (2013.01); *F24D 3/1066* (2013.01); *Y02B 10/70* (2013.01); *Y02B 30/12* (2013.01)

(56) References Cited

U.S. PATENT DOCUMENTS

| | | | |
|---|---|---|---|
| 4,178,907 A * | 12/1979 | Sweat, Jr. | ................. F24H 6/00 |
| | | | 122/20 B |
| 4,371,111 A | 2/1983 | Pernosky | |
| 4,373,354 A | 2/1983 | Sawyer | |
| 4,970,373 A * | 11/1990 | Lutz | ...................... F24H 9/2028 |
| | | | 219/492 |
| 5,074,464 A | 12/1991 | Moore et al. | |
| 5,076,494 A | 12/1991 | Ripka | |
| 5,192,022 A | 3/1993 | Swenson | |
| 5,226,594 A | 7/1993 | Swenson | |
| 5,544,645 A | 8/1996 | Armijo et al. | |
| 6,601,773 B2 | 8/2003 | Saitoh et al. | |
| 7,021,073 B2 | 4/2006 | Sakakibara | |
| 8,662,404 B2 | 3/2014 | York et al. | |
| 2007/0246555 A1 | 10/2007 | Nishimuar et al. | |
| 2009/0078783 A1* | 3/2009 | Cuppetilli | ................. F24D 9/00 |
| | | | 237/19 |
| 2010/0101506 A1 | 4/2010 | Furui et al. | |
| 2010/0101767 A1* | 4/2010 | Furui | ...................... F24D 3/087 |
| | | | 165/163 |
| 2010/0126705 A1 | 5/2010 | Furui et al. | |
| 2011/0218663 A1 | 9/2011 | Hashimoto | |
| 2011/0218683 A1 | 9/2011 | Ben-Yaacov et al. | |
| 2012/0060827 A1 | 3/2012 | Roetker | |
| 2012/0067074 A1* | 3/2012 | Lesage | ...................... F24H 4/04 |
| | | | 62/238.6 |
| 2012/0145095 A1* | 6/2012 | Nelson | ...................... F24H 4/04 |
| | | | 122/15.1 |
| 2012/0222631 A1 | 9/2012 | Lesage et al. | |
| 2012/0272948 A1 | 11/2012 | Kristjansson | |
| 2012/0298204 A1 | 11/2012 | Erez | |
| 2013/0047654 A1 | 2/2013 | Fukunaga et al. | |
| 2014/0102124 A1 | 4/2014 | Ben-Yaacov et al. | |
| 2014/0208791 A1 | 7/2014 | Suzuki et al. | |
| 2014/0291411 A1 | 10/2014 | Tamaki et al. | |
| 2015/0033779 A1 | 2/2015 | Seggerman | |
| 2015/0060007 A1 | 3/2015 | Smith | |
| 2018/0245801 A1 | 8/2018 | Schindler et al. | |

FOREIGN PATENT DOCUMENTS

| | | | |
|---|---|---|---|
| CN | 103528113 | 1/2014 | |
| EP | 1674802 | 6/2006 | |
| GB | 1180463 A * | 2/1970 | ........... F24D 3/1066 |
| GB | 2405702 | 3/2005 | |
| JP | 2008267790 | 11/2008 | |
| JP | 2008267792 | 11/2008 | |
| JP | 2008275302 | 11/2008 | |
| JP | 2010096498 | 4/2010 | |
| JP | 2013044507 | 3/2013 | |
| JP | 2014145532 | 8/2014 | |
| WO | WO-2012121382 A1 * | 9/2012 | ......... F24D 19/1054 |

OTHER PUBLICATIONS

International Search Report and Written Opinion issued in PCT/US2016/046917, dated Oct. 21, 2016.

* cited by examiner

HOT WATER HEATING SYSTEMS AND RELATED METHODS

CROSS-REFERENCE TO RELATED APPLICATIONS

This application is a continuation of U.S. patent application Ser. No. 15/894,097, filed Feb. 12, 2018, and entitled Hot Water Heating System and Related Methods, which is a continuation-in-part of International PCT Patent Application. No. PCT/US2016/046917, filed Aug. 12, 2016, and entitled Hot Water Heating Systems and Related Methods, which claims the benefit of U.S. Provisional Patent Application No. 62/204,182, filed on Aug. 12, 2015, entitled Max Smart Heat System, which are expressly incorporated herein by reference in their entireties.

FIELD OF THE INVENTION

The present disclosure relates generally to heat circulation systems, and, more particularly, to hydronic or hot water heating systems.

BACKGROUND

Hot water heating systems provide a clean and comfortable source of heat in a building, dwelling or other structure. Hot water heating systems have the added benefit of keeping the air moist. Typically, a hot water heating system includes a heat source powered by either electricity or burning of a high grade fuel (e.g., a fossil fuel), a water circulation system, a water temperature sensing device for controlling the rate of combustion in the heat source, and a thermostat for controlling the rate of circulation of water throughout the system. The water circulation system is commonly configured to pass cool water near the heat source to heat the water, conduct or pass the heated water to remote radiators, and returning the cooler water to the heat source for reheating. Typical forced air heating systems pass cool air near a heat source and into the heat duct work system throughout the house. Commonly, the heat source is a furnace which burns a high grade fuel such as natural gas, oil, coal or any other fossil fuel.

High grade fuels are typically utilized in heating systems (e.g., hot water and hot air systems) due to their steady, easily adjustable rate of combustion. However, such fuels are also characterized by their relatively high cost, which is steadily increasing, especially with respect to home heating oil and even natural gas. Further, such fuels negatively impact the environment. For example, burning fossil fuels releases relatively large quantities of sulphur dioxide, nitrogen oxides and carbon dioxide which can contribute to acid rain and global warming. Further, fossil fuels are non-renewable resources with a limited lifespan. More efficient hot water heating systems have therefore become desirable to reduce heating costs, conserve fossil fuels, and at least reduce the negative impacts to the environment as compared to conventional fossil-fuel burning heating systems.

A widely accepted and used water heater for residential hot water production and storage, rather than for heating purposes, is the electric resistance water heater and storage tank. Water heaters typically include a tank defining a chamber for retention of water. A water inlet pipe that is provided with a first connection for interconnection with a cold water supply line that conveys fresh relatively cold water into the chamber. Within the tank there are electric resistance elements that heat the water in the tank. In current embodiments, there are at least two electric resistance elements. A first electric resistance element positioned near the bottom of the tank and a second electric resistance element positioned near the top of the tank. There are also two sensors positioned on the exterior of the tank that measure the temperature of the tank near the top and bottom of the tank in proximity to the location of the electric resistance elements. When the temperature sensed by such sensors drops below a certain temperature level, these sensors close the contacts associated with the corresponding electric resistance elements causing the electric resistance elements to energize.

When water is supplied to the tank, it is supplied through a dip tube that pushes the cold water to the bottom of the tank and thereby pushes the hot water out of the top through the outlet pipe where water is the hottest. One of the problems with this configuration is that the sensor near the top of the tank can't detect that hot water is exiting and cold water is entering the tank near the bottom. The lower sensor detects that cold water is entering the tank when it detects a temperature drop at the thermostat, which is the primary purpose for having two sensors. When the lower sensor detects a temperature drop below a certain level, it closes the contact and energizes the lower electric resistance element until the temperature reaches a specified level. But, each time the lower electric resistance element heats the water; the heated water is buoyant and goes up to the top of the tank. For example, if the tank is holds 50 gallons of water, and three gallons of water flow into the tank, it may cause the lower electric resistance element to be energized for a few minutes in order to recover the temperature. If a few minutes later, there is a draw of another three gallons of water, the lower electric resistance element is energized again for another few minutes in order to recover the temperature. This causes the heated water to rise to the top creating a problem called stacking.

Under sequential small draws of water, the lower electric resistance element is energized each time and runs until the lower sensor is satisfied that the lower part of the tank is sufficiently warm. When this is occurring, the top part of the tank continues to get a little bit hotter each time which causes over heating of water in the top of the tank, which can potentially lead to undesirably hot water being drawn from the tank. There is therefore a need for a hot water heater configuration that solves the problem associated with stacking resulting from small sequential water draws made on current water heaters. Further, such electric resistance hot water heaters and storage tanks are thereby unable to produce the volume of hot water needed for hot water heating systems, and are less efficient that typical hot water heating systems as describe above.

The present disclosure provides hot water heating systems that overcome the above noted drawbacks and problems of existing hot water heating systems and water heaters.

BRIEF DESCRIPTION

In one aspect, the present disclosure provides for a hot water heating system for heating the atmosphere within at least one predefined area of a structure. The system includes a hybrid water heating and storage apparatus configured to store and heat water to at least about 140 degrees Fahrenheit including a heat pump and an electric heating tank in fluid communication. The electric heating tank stores the heated water. The system also includes a first heat exchange fixture positioned in a first predefined area within the structure. The system also includes a first recirculating pump configured to selectively draw a hot output flow of the heated water from the electric heating tank, pass the heated water through the first heat exchange fixture to heat the atmosphere within the first predefined area, and direct the water back to the electric heating tank from the first heat exchange fixture as a cold input flow. The system further includes a first thermostat electrically coupled to the first recirculating pump and positioned within the first predefined area configured to sense the temperature of the atmosphere within the first predefined area. In a hybrid mode of operation of the apparatus, the heat pump exclusively heats the water when the water is at a first temperature, and the heat pump and the electric heating tank both heat the water when the temperature of the water decreases from the first temperature to a second temperature that is colder than the first temperature. The first thermostat controls selective operation of the first recirculating pump based on a sensed temperature and a user selected temperature.

In another aspect, the present disclosure provides for a method of heating the atmosphere within a predefined area of a structure. The method includes providing a hybrid water heating and storage apparatus configured to store and heat water to at least about 140 degrees Fahrenheit including a heat pump and an electric heating tank in fluid communication. The electric heating tank being configured to store the heated water. The method also includes selectively drawing an output flow of the heated water from the electric heating tank, passing the heated water through a first heat exchange fixture positioned within a first predefined area to heat the atmosphere therein, and directing the water back to the electric heating tank as a cold input flow via a first recirculating pump. The method also includes electrically coupling a first thermostat to the first recirculating pump that is positioned within the first predefined area and configured to sense the temperature therein. The method further includes heating the water when the water is at a first temperature via the heat pump of the apparatus. The method also includes heating the water when the temperature of the water decreases from the first temperature to a second temperature that is colder than the first temperature via the heat pump and the electric heating tank. The method further includes selectively operating the first recirculating pump based on a sensed temperature and a user selected temperature via the first thermostat.

In another aspect, the present disclosure provides for a method of installing a hot water heating system for heating the atmosphere within at least one predefined area of a structure. The method includes fluidly coupling a water supply to a hybrid water heating and storage apparatus configured to store and heat water to at least about 140 degrees Fahrenheit including a heat pump and an electric heating tank in fluid communication, the electric heating tank storing the heated water. The method further includes fluidly coupling a recirculating pump between an outlet and at least one heat exchange fixture positioned in a first predefined area within the structure, the recirculating pump configured to selectively draw an output flow of the heated water from the electric heating tank via the outlet, pass the heated water through at least one heat exchange fixture positioned within the first predefined area to heat the atmosphere therein, and direct the water back to the electric heating tank as a cold input flow. The method also includes electrically coupling a thermostat to the recirculating pump that is positioned within the first predefined area and configured to sense the temperature of the atmosphere within the first predefined area. The method further includes configuring the thermostat to control operation of the recirculating pump based on a sensed temperature and a user selected temperature. The method also includes configuring the apparatus to operate in a hybrid mode such that the heat pump exclusively heats the water when the water is at a first temperature, and the heat pump and the electric heating tank both heat the water when the temperature of the water decreases from the first temperature to a second temperature that is colder than the first temperature.

These and other objects, advantages and features of the present disclosure will be better appreciated by those having ordinary skill in the art in view of the following detailed description of the present disclosure in view of the drawings.

BRIEF DESCRIPTION OF THE DRAWINGS

The various exemplary embodiments of the present disclosure, which will become more apparent as the description proceeds, may be described in the following detailed description in conjunction with the accompanying drawings, in which.

DETAILED DESCRIPTION

Figure 1:
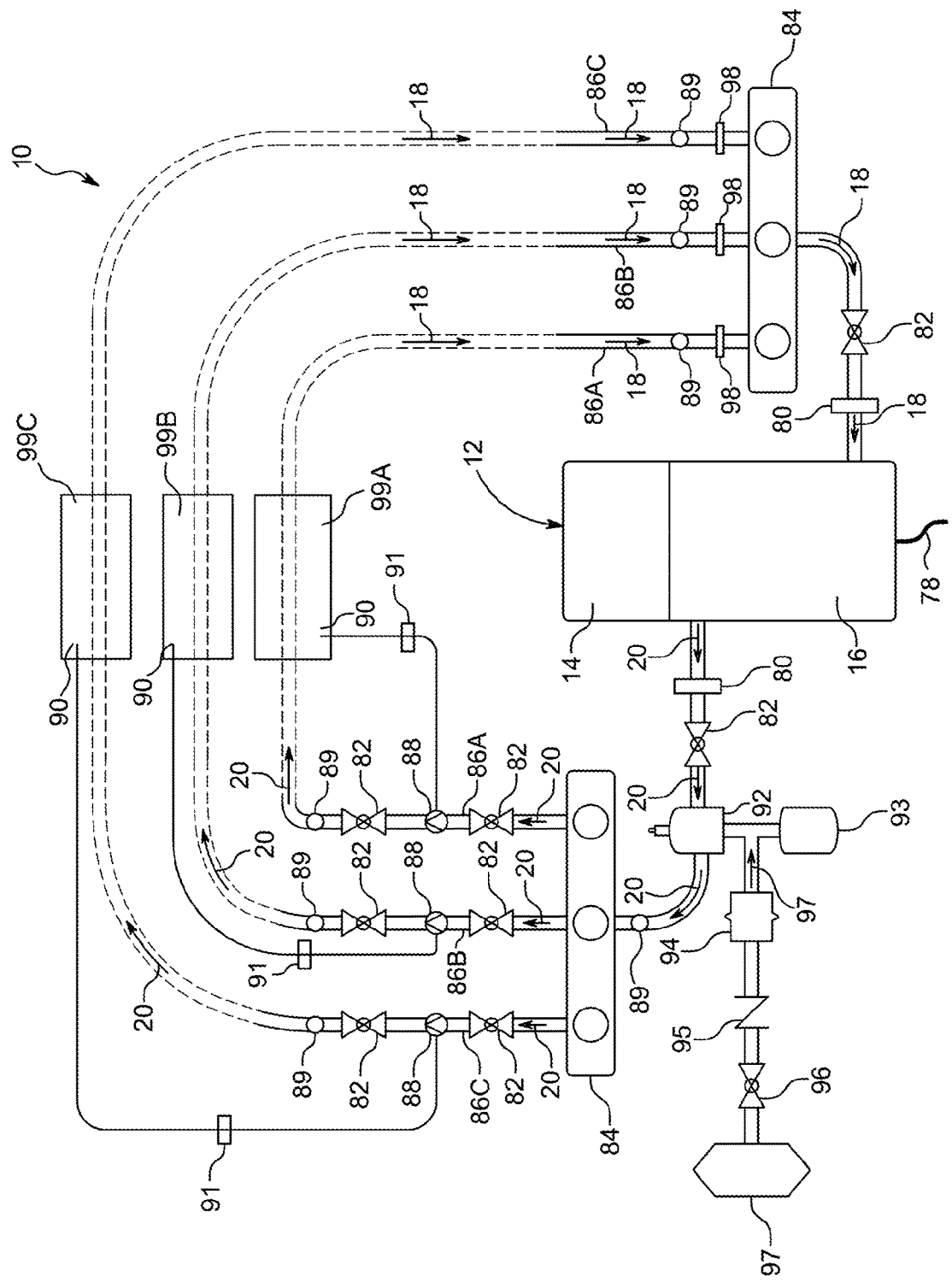
FIG. 1 illustrates a schematic of a hot water heating system according to the present disclosure.

Aspects of the present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the present disclosure in detail. It should be understood, however, that the detailed description and the specific examples, while indicating embodiments of the present disclosure, are given by way of illustration only, and are not by way of limitation. Various substitutions, modifications, additions and/or arrangements within the spirit and/or scope of the underlying inventive concepts will be apparent to those skilled in the art from this disclosure.

Note also that reference is made below to the drawings, which are not drawn to scale for ease of understanding, wherein the same reference numbers used throughout different figures designate the same or similar components. For the sake of clarity, only those elements and reference characters which are of relevance to the shown aspects of the respective embodiment of the present invention are shown repeatedly. In this regard, no attempt is made to show structural details of the invention in more detail than is necessary for a fundamental understanding of the invention, the description taken with the drawings making apparent to those skilled in the art how the several forms of the invention may be embodied in practice.

Unless defined otherwise, all technical and scientific terms used herein have the same meaning as commonly understood to one of ordinary skill in the art to which this invention belongs. Systems, methods, devices and materials similar or equivalent to those described herein below may equally be used in the practice or testing of the present disclosure spirit and/or scope of the underlying inventive concepts of the present disclosure.

As shown in FIG. 1, the present disclosure provides for a hot water or hydronic heating system 10 and related heating methods that produces and selectively circulates hot or warm water, as opposed to boiling water or steam, through pipes to radiators or other heating fixtures or exchangers that radiate the heat into the atmosphere in defined areas of a structure via predominately convection (natural and/or forced), such as into rooms or areas of a dwelling. As shown in FIGS. 1-5, the system 10 may include a hybrid electric and heat pump water heating and storage apparatus 12 that is configured to heat cool input water 18 and store and output warm or hot water 20. In some embodiments, the water heating and storage apparatus 12 may be configured to heat the temperature of the water stored within the apparatus 12, and thereby the output warm or hot water 20, to at least about 140 degrees Fahrenheit, or at least about 160 degrees Fahrenheit. In some embodiments, the water heating and storage apparatus 12 may be configured to heat the temperature of the water stored within the apparatus 12, and thereby the output warm or hot water 20, at least about 170 degrees Fahrenheit. In some embodiments, the water heating and storage apparatus 12 may be configured to heat the temperature of the water stored within the apparatus 12 to a temperature within the range of about 140 degrees Fahrenheit to about 190 degrees Fahrenheit. In some embodiments, the water heating and storage apparatus 12 may be configured to heat the temperature of the water stored within the apparatus 12 to a temperature within the range of about 140 degrees Fahrenheit to about 180 degrees Fahrenheit. In some embodiments, the water heating and storage apparatus 12 may be configured to heat the temperature of the water stored within the apparatus 12 to a temperature within the range of about 140 degrees Fahrenheit to about 170 degrees Fahrenheit, such as about 150 degrees Fahrenheit or about 160 degrees Fahrenheit. The heating and storage apparatus 12 may be configured to heat the temperature of the water stored therein based on a pre-set or user-selectable.

In some embodiments, the water heating and storage apparatus 12 may be configured to heat the temperature of the water stored within the apparatus 12 such that the cool input water 18 returning to the apparatus 12 after heating one or more predefined areas 99A, 99B, 99C of a structure, as explained further below, is at least about 120 degrees Fahrenheit, at least about 125 degrees Fahrenheit, at least about 130 degrees Fahrenheit, at least about 135 degrees Fahrenheit, or at least about 140 degrees Fahrenheit. In some embodiments, the water heating and storage apparatus 12 may be configured to heat the temperature of the water stored within the apparatus 12 such that the cool input water 18 returning to the apparatus 12 after heating one or more predefined areas 99A, 99B, 99C of a structure, as explained further below, is at least about 160 degrees Fahrenheit. The system 10 may include a temperature sensor to sense the temperature of the cool input water 18.

In some embodiments, the water heating and storage apparatus 12 may be any apparatus that is configured to heat the water stored therein exclusively via a heat pump 14 thereof if the temperature of the water stored within the apparatus 12 is at or above a defined minimum temperature (e.g., predefined or selectively (i.e., user selectable or adjustable) defined minimum temperature) and below a defined maximum temperature, and thereby potentially maintain the temperature of the output water 20 at or above the defined minimum temperature and below defined maximum temperature. In this way, the water heating and storage apparatus 12 may have a heat pump only mode of operation. The heat pump only mode of operation of the apparatus 12 may be an automatic mode or may be a manual mode selected by a user. The defined minimum temperature may thereby the temperature that the water heating and storage apparatus 12 is configured to heat the temperature of the water stored within the apparatus 12, and thereby the output warm or hot water 20, as outlined above. In some embodiments, the defined minimum temperature may be at least about 140 degrees Fahrenheit. In some embodiments, the defined minimum temperature may be within the range of about 140 degrees Fahrenheit to about 170 degrees Fahrenheit. In some embodiments, the defined minimum temperature may be within the range of about 150 degrees Fahrenheit to about 170 degrees Fahrenheit. In some embodiments, the defined minimum temperature may within the range of about 150 degrees Fahrenheit to about 180 degrees Fahrenheit. In some embodiments, the defined maximum temperature may be about 180 degrees Fahrenheit, or about 190 degrees Fahrenheit. The defined maximum temperature may ensure the water within the system 10 is maintained in a liquid state. The defined maximum temperature of the heating and storage apparatus 12 may be a pre-set or user-selectable temperature.

In some embodiments, the apparatus 12 may be configured to instruct the heat pump 14 to heat the water stored therein based on a temperature differential below the defined minimum temperature. In this way, the heat pump 14 may heat the water when the temperature thereof is below the defined minimum temperature by the temperature differential. The temperature differential may be a predefined or selected minimum (i.e., user selectable or adjustable) defined temperature difference less than the defined minimum temperature. In some such embodiments, the temperature differential may be about 5 degrees Fahrenheit. In some other such embodiments, the temperature differential may be about 10 degrees Fahrenheit. In some such embodiments, the temperature differential may be user selectable or adjustable within a range of temperature differentials, such as a range from a 5 degree Fahrenheit temperature differential to a 15 degree Fahrenheit temperature differential. In some embodiments, the temperature differential may be a differential in temperature of the water within the tank 16 below the defined minimum temperature. The temperature differential of the heating and storage apparatus 12 may be a pre-set or user-selectable temperature differential.

The water heating and storage apparatus 12 may also be configured to heat the water stored therein via the heat pump 14 and an electric heating tank 16 thereof if the temperature of the water stored within the apparatus 12 falls below the defined minimum temperature and/or to optimize efficiency of the apparatus 12. In this way, the water heating and storage apparatus 12 may have a hybrid heat pump and electric heating tank mode of operation. Thereby, while operating in the hybrid mode of operation, the heat pump 14 may exclusively heat the water of the tank 24 when the water is at a first temperature, and the heat pump and the electric heating tank may both heat the water when the temperature of the water decreases from the first temperature to a second temperature that is colder than the first temperature. The hybrid mode of operation of the apparatus 12 may be an automatic mode or may be a manual mode selected by a user. In some embodiments, the water heating and storage apparatus 12 may operate in the hybrid mode of operation from when the temperature of the water stored within the apparatus 12 falls below the defined minimum temperature until the water is heated to a defined hybrid maximum temperature (e.g., a predefined or selectively defined maximum temperature). The defined hybrid maximum temperature may correspond to the defined minimum temperature, correspond to the defined maximum temperature, the defined maximum temperature minus the temperature differential, if utilized, or may be a temperature between the defined minimum temperature (minus the temperature differential, if utilized) and the defined maximum temperature. In some embodiments, the defined hybrid maximum temperature may be at least about 140 degrees Fahrenheit. In some embodiments, the defined hybrid maximum temperature may be about 150 degrees Fahrenheit, or about 160 degrees Fahrenheit.

In some embodiments, the water heating and storage apparatus 12 may automatically operate in the hybrid mode of operation when the temperature of the water stored within the apparatus 12 falls below the defined minimum temperature. The hybrid mode of operation may also be manually or selectively operated. The water heating and storage apparatus 12 may be configured to automatically operate in the hybrid mode of operation when the temperature of the water stored within the apparatus 12 falls bellows below a hybrid setpoint temperature (e.g., a predefined or selectively defined hybrid setpoint temperature). The hybrid setpoint temperature may be less than the defined minimum temperature. In some embodiments, the defined hybrid setpoint temperature may be at least about 140 degrees Fahrenheit. In some embodiments, the defined hybrid setpoint temperature may be about 150 degrees Fahrenheit. In some embodiments, the defined hybrid setpoint temperature may be about 160 degrees Fahrenheit. In some embodiments, the defined hybrid setpoint temperature may be the defined minimum temperature less twice the temperature differential.

In some embodiments, the water heating and storage apparatus 12 may be configured to heat the water stored therein exclusively via the electric heating tank 16 thereof. In this way, the water heating and storage apparatus 12 may have an electric heater only mode of operation. The electric heater only mode of operation of the apparatus 12 may be an automatic mode or may be a manual mode selected by a user.

Figure 2:
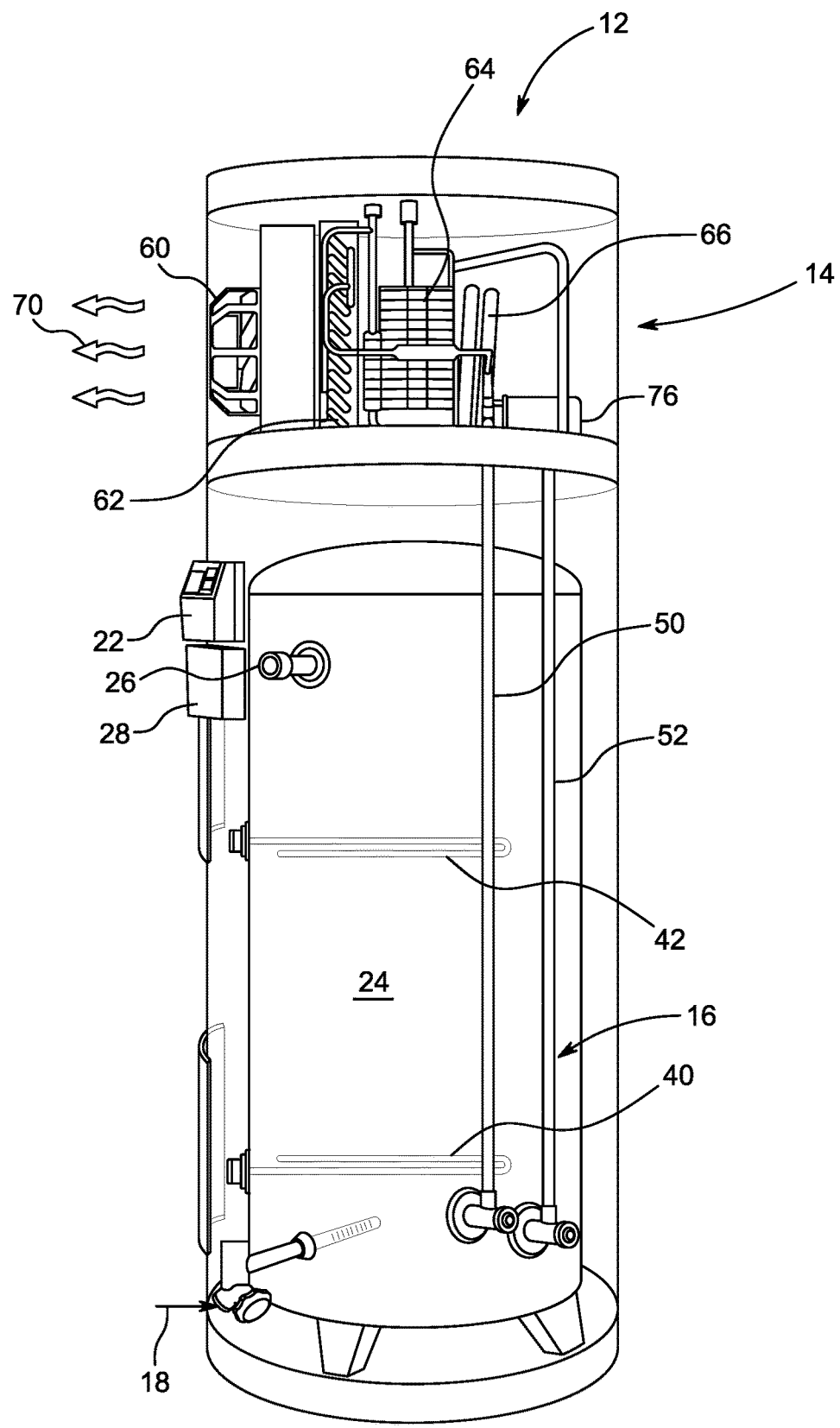
FIG. 2 illustrates a perspective sectional view of a water heating and storage apparatus of the hot water heating system of FIG. 1 according to the present disclosure.
Figure 3:
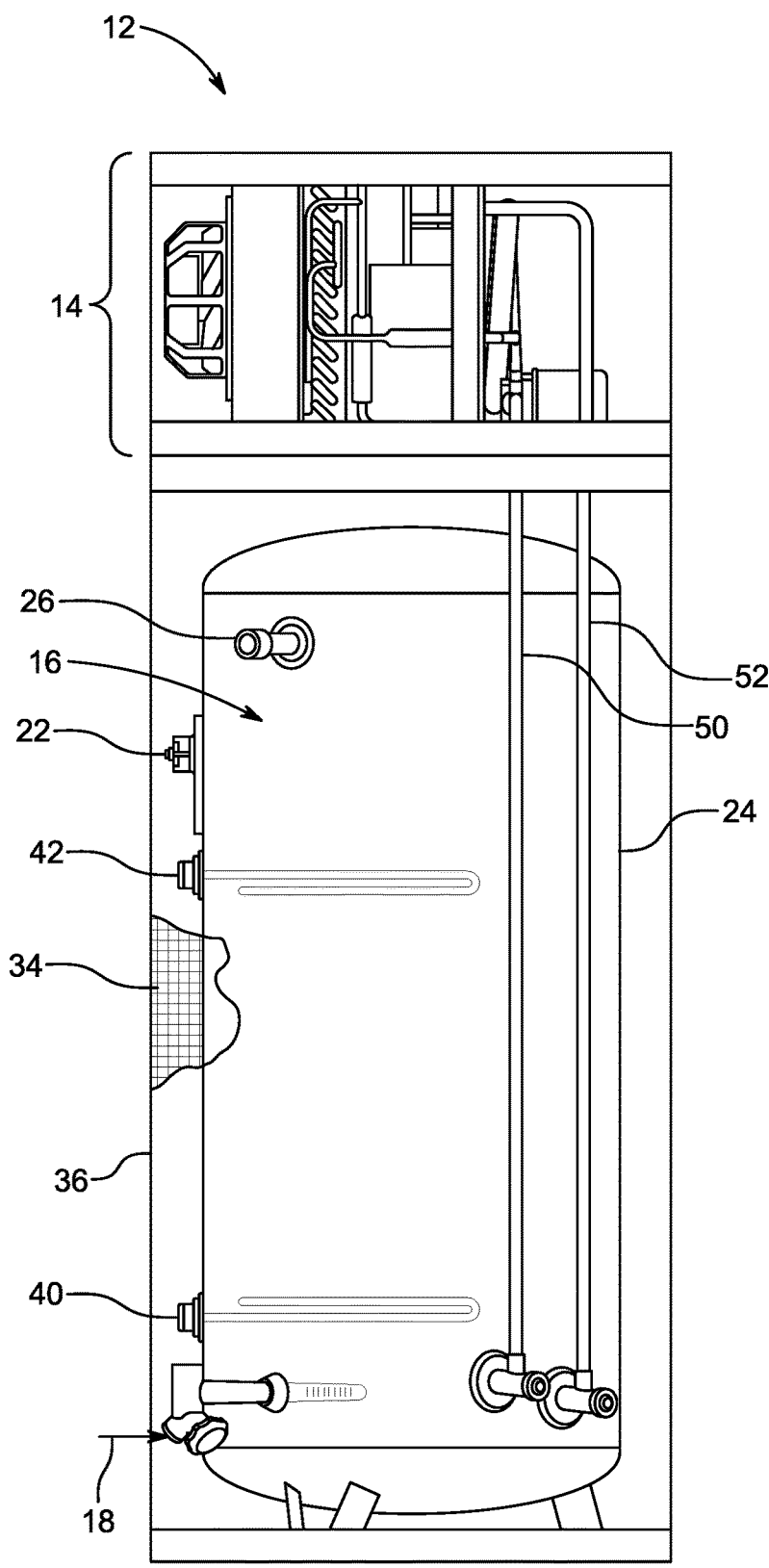
FIG. 3 illustrates a side sectional view of the water heating and storage apparatus of FIG. 2.
Figure 4:
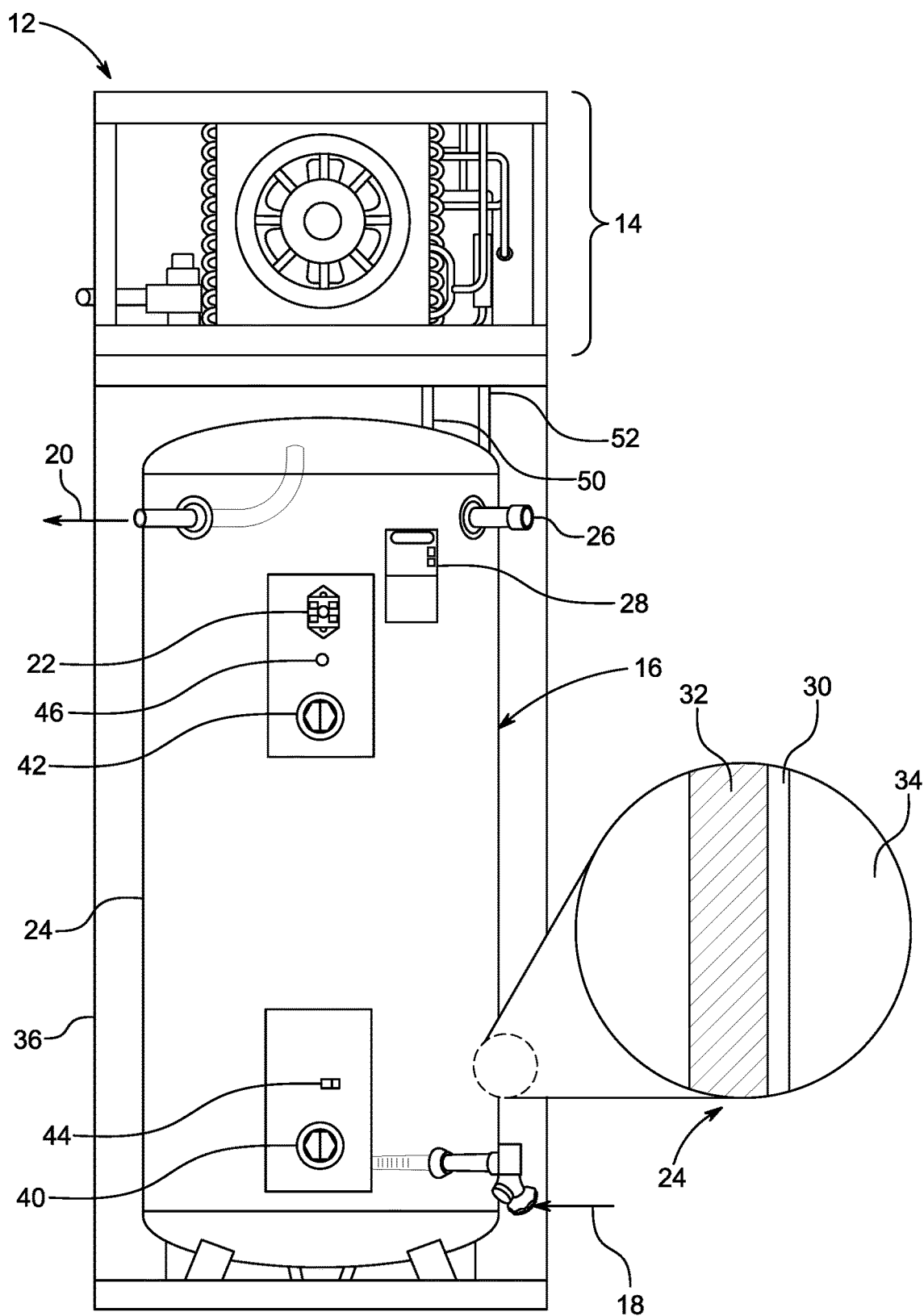
FIG. 4 illustrates a front sectional view of the water heating and storage apparatus of FIG. 2.

As shown in FIGS. 2-4, the electric heating tank 16 of the water heating and storage apparatus 12 may include at least one hollow tank 24 for storing the water therein. The tank 24 of the electric heating tank 16 may store the water that is heated by the electric heating tank 16 and/or is heated by the heat pump 14. In some embodiments, the heated output water 20 may be drawn or flows from a top or upper portion of the tank 24, and/or the cool input water 18 may be drawn or flows from a bottom or lower portion of the tank 24, as shown in FIGS. 2-4. As also shown in FIGS. 2-4, the tank 24 may include at least one temperature gauging mechanism 22 (such as a least one thermostat) configured to sense or determine the temperature of the water stored therein (i.e., the temperature of the water stored in the apparatus 12). The least one temperature gauging mechanism 22 may be positioned proximate to the flow of heated output water 20. In some embodiments, the water heating and storage apparatus 12 may be configured to utilize the temperature gauging mechanism 22 to determine or sense the temperature of the water stored in the apparatus 12 and, based on the temperature, operate in either the heat pump only mode or the hybrid mode, for example. As shown in FIGS. 2-4 the apparatus 12 may include a controller 28 that, based on the temperature of the water stored within the tanks as indicated by the temperature gauging mechanism 22, operates the apparatus 12 in a particular mode, such as either the heat pump only mode or the hybrid mode for example.

The tank 24 of the electric heating tank 16 of the water heating and storage apparatus 12 may be substantially sealed and configured to store, hold or contain numerous gallons of water. For example, in one embodiment the tank 24 may be configured to store at least about 30 gallons of water, for example. In some embodiments, the tank 24 may be configured to store 50 gallons of water, 65 gallons of water, 80 gallons of water or 120 gallons of water. The storage capability of the tank 24 however may depend, or at least be related to, to number and/or size of defined areas that are heated by the apparatus 12, as explained further below. The tank 24 may be sealed such that the water stored therein and elsewhere the apparatus 12 and the system 10 is under pressure, as explained further below. For example, the water within the system 10, including the water stored within the tank 24, may be configured to be under at least about 18 psi of pressure. To prevent the tank 24 (and potentially other portions of the apparatus 12 and system 10) from becoming over pressurized and thereby damaged, the tank 24 may include at least one pressure relief valve 26 configured to control or limit the pressure in the tank 24 and system 10 by allowing the pressurized water to flow from the tank 24, for example. In some embodiments, the at least one pressure relief valve 26 may be configured to prevent the pressure in the tank 24 and system 10 from exceeding about 30 psi, for example. In some embodiments, the pressure relief valve 26 may be an automatic reseating combination temperature and pressure safety relief valve (e.g., set at 30 psi or greater and a temperature of 210 degrees Fahrenheit, for example).

To prevent failure of the tank 24 (i.e., leakage of the water stored therein), the tank 24 may be configured to withstand the interaction with the warm or hot pressured water stored thereon for an extend period of time. For example, as shown in FIG. 4 the tank 24 may be constructed of a metallic (e.g., steel, such as cold rolled steel) pressure vessel 30 that may or may not be lined with cement 32 on interior surfaces. The cement liner 32 may interact with or about the water stored within the tank 24. In some embodiment, the cement liner 32 may be no less than about ½ inch thick on the interior surfaces of the pressure vessel 30. The interior surfaces of the pressure vessel 30 and the cement liner 32 may be void of a sacrificial anode. In some embodiments, the pressure vessel 30 may include a glass liner, such as a fiberglass liner. In some embodiments, the pressure vessel 30 and the cement liner 32 may be configured to withstand up to 150 psi working pressure. As shown in FIGS. 3 and 4, the tank 24 may also include insulation 34. The insulation 34 may completely surround at least the tank 24. In some embodiments, the insulation 34 may completely surround the entirety of the electric heating tank 16 and/or the heat pump 14. In some embodiments, the insulation 34 may be foam insulation, such as CFC free polyurethane foam insulation. In some embodiments, the insulation 34 may be at least two inches thick. A shown in FIGS. 3 and 4, the apparatus 12 may include protective jacket 36 that surrounds the apparatus 12 (i.e., surrounds the electric heating tank 16 and the heat pump 14). The protective jacket 36 may be formed of a high impact colorized composite material that does not rust, corrode or require painting.

The electric heating tank 16 of the water heating and storage apparatus 12 may heat the water stored within the tank 24 thereof via at least one resistive electric heating element. For example, as shown in FIGS. 2-4 the electric heating tank 16 may include a relatively low heating element 40 proximate to the bottom of the tank 24 and the inlet flow of cool water 18, and a relatively high heating element 42 proximate to the top of the tank 24 and the outlet flow of heated water 20. The at least one resistive electric heating element 40, 42 of the electric heating tank 16 may be at least one immersion electric resistance heating element. In some embodiments, the at least one immersion electric resistance heating element may be incoloy sheathed. In the embodiments shown in FIGS. 2-4, the heating elements 40, 42 are shown projecting into the interior of the tank 24. However, other configurations providing for positioning the upper 42 and lower 40 heating elements to heat the water in the upper and lower regions of the tank 24, respectively, could be similarly employed. In some embodiments the at least one resistive electric heating element 40, 42 of the electric heating tank 16 may be draw or utilize about 3,000 W to about 5,500 W during heating of the water therein, such as with the range of 3,800 W to about 4,500 W. In some embodiments the heat pump 14 may draw or utilize about 600 W about 750 W during heating of the water, such as 680 W.

In some embodiments, the controller 26 may operate the upper 42 and lower 40 heating elements. For example, the electric heating tank 16 of the water heating and storage apparatus 12 may include a lower thermistor sensor 44 proximate to the lower electric resistance heating element 40, and an upper thermistor sensor 46 proximate to the upper electric resistance heating element 42. The controller 26 may be in communication with the lower thermistor sensor 44 and the upper thermistor sensor 46 to determine the temperature of the stored water proximate to the lower electric resistance heating element 40 and the upper electric resistance heating element 42, respectively. In response to the determined temperature of the stored water proximate to the lower electric resistance heating element 40 and the upper electric resistance heating element 42 via the lower thermistor sensor 44 and the upper thermistor sensor 46, respectively, the controller 26 may control the amount of electrical current that is applied to the lower electric resistance heating element 40 and the upper electric resistance heating element 42 (and thereby the temperature thereof) based on the mode of the system 10, the defined minimum temperature (e.g., a temperature differential from a setpoint temperature), the defined maximum temperature, the defined hybrid maximum temperature, efficiency purposes, or a combination thereof. In some embodiments, the lower electric resistance heating element 40 and the upper electric resistance heating element 42 may be controlled independently by the controller 26. For example, the defined minimum temperature (e.g., a temperature differential from a setpoint temperature) at which the controller 26 applies current to the lower electric resistance heating element 40 may be greater than that of the upper electric resistance heating element 42.

As noted above, the water stored within the tank 24 of the electric heating tank 16 of the water heating and storage apparatus 12 may be exclusively or primarily heated by the heat pump 14 of the apparatus 12, depending upon the particular operating mode of the system 10 and, potentially, the temperature of the water within tank 24 at a given time. In some embodiments, the heat pump 14 may be physically positioned above the electric heating tank 16, as shown in FIGS. 2-5. However, the heat pump 14 and the electric heating tank 16 may be arranged differently. As shown in FIGS. 2-4, the heat pump 14 and the electric heating tank 16 may interact with each other via a cold water input tube 50 (e.g., a dip tube) and a heated water outlet tube 52 (e.g., a dip tube) extending from the heat pump 14 into a lower portion of the tank 24 of the electric heating tank 16 proximate to the bottom thereof. For example, the cold water input tube 50 and the heated water outlet tube 52 may extend to a position within the tank 24 that is below the lower electric resistance heating element 40, as shown in FIGS. 2-4. As explained further below, the cold water input tube 50 may draw relatively cold water from a lower portion of the tank 24 of the electric heating tank 16, and the heated water outlet tube 52 may input or introduce hot or warm water heated by the heat pump 14 into a lower portion of the tank 24 of the electric heating tank 16, as shown in FIGS. 2-4. The introduced hot or warm water heated by the heat pump 14 may rise through the tank 24 and, ultimately, form the flow of heated output water 20 from the apparatus 12. In some embodiments, the cold water input tube 50 and/or the heated water outlet tube 52 may be fixedly or removable coupled to respective portions of the heat pump 14. For example, the cold water input tube 50 and/or the heated water outlet tube 52 may be soldered or brazed to respective portions of the heat pump 14, or may be threadably coupled to respective portions of the heat pump 14. In some embodiments, the cold water input tube 50 may include a shutoff valve and an air bleeder or other mechanism (not shown) downstream of the shutoff valve and upstream of the heat pump 14 configured to remove air flowing through the cold water input tube 50 from the apparatus 12.

The heat pump 14 may utilize a small amount of electricity to transfer heat from the air to the relatively cold water from a lower portion of the tank 24 supplied by the cold water input tube 50. For example, the heat pump 14 may be more electrically efficient in comparison to traditional electric water heaters that use resistive heating elements. As another example, the heat pump 14 may be more electrically efficient in comparison to the electric heating tank 16, as it utilizes at least one resistive electric heating element 40, 42 as explained above. The water heating and storage apparatus 12 may thereby utilize less than half the electricity of a traditional electric water heater to produce the same amount of hot water, and therefore the apparatus is significantly more energy efficient compared to a conventional electric water heater. In some embodiments, the heat pump 14 may provide at least about 7,000 BTU or BTU/hr.

In principle, the heat pump 14 may operate similar to a refrigerator in reverse. For example, a refrigerator moves heat from inside the refrigerator and transfers that heat energy to the surrounding room. Conversely, the heat pump 14 is configured to pull free and essentially unlimited heat from surrounding air and transfers that heat to the cold water from the tank 24 supplied by the cold water input tube 50. The heat pump 14 may be configured to pull heat out of air as cool as 40 degree Fahrenheit. Further, as discussed above if the heat pump 14 is unable to provide enough heating capacity to meet demand, the apparatus 12 includes at least one back-up resistive heating element to ensure the apparatus 12 provides sufficient hot water to the system 10. In addition, the proceeds of the heat pump 14 removing heat from the air and transferring it to the cold water from the tank 24 may result in the exhaust of cooler dryer air, with as much as 0.4 gallons per hour of "free" dehumidification provided by the heat pump 14 while the apparatus 12 is heating water.

The heat pump 14 may be any configured or mechanism that operates to pull heat from air surrounding the apparatus 12 and transfer that heat to the cold water from the tank 24 supplied by the cold water input tube 50. For example, with reference to FIGS. 2 and 5 the heat pump 14 may include at least one fan 60, an evaporator 62, a compressor 64 and a condenser or heat exchanger 66. The evaporator 62, compressor 64 and condenser or heat exchanger 66 maybe in fluid communication with each other and form a heat pump cycle flowpath.

Figure 5:
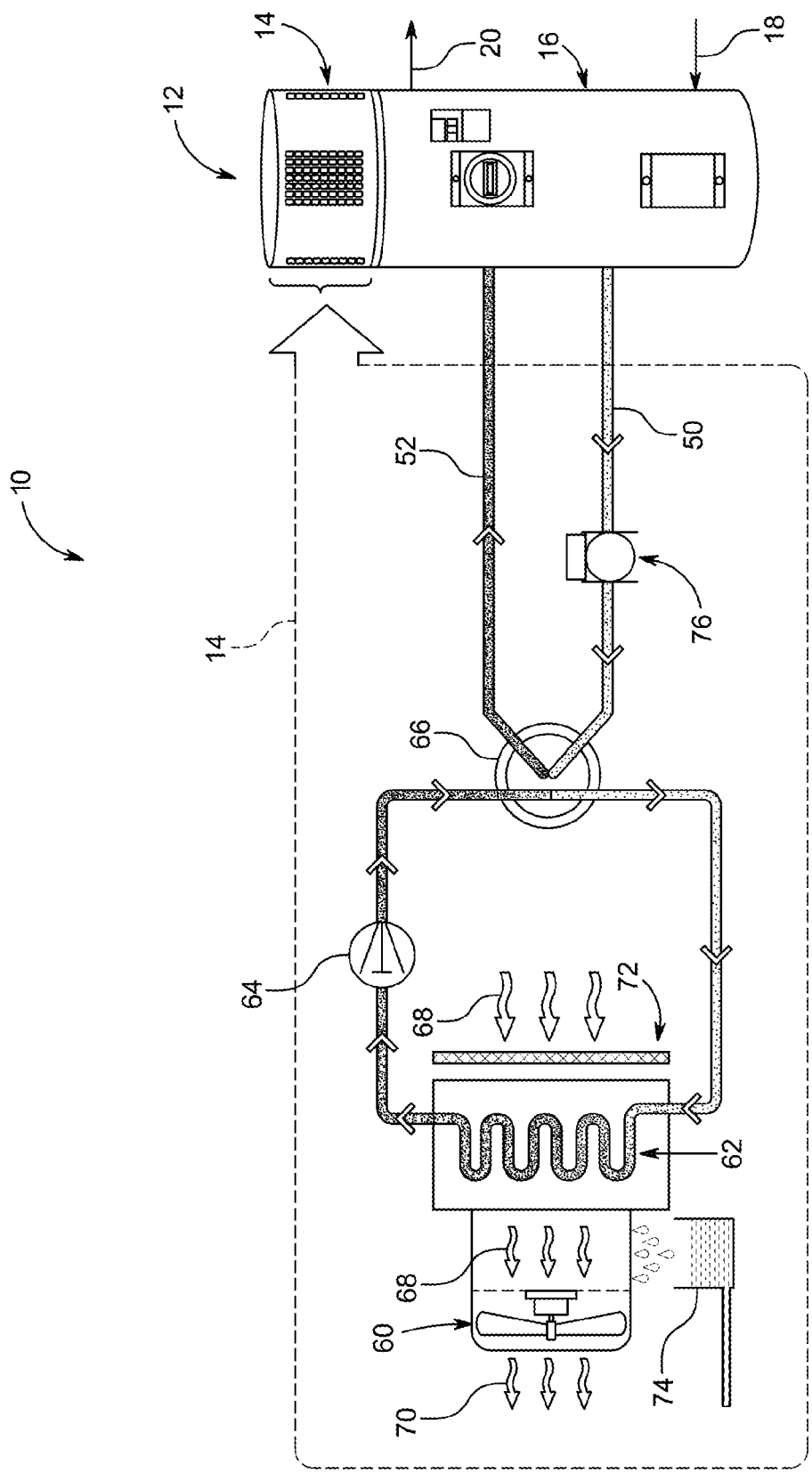
FIG. 5 illustrates a schematic of the operation of a heat pump of the hot water heating and storage apparatus of FIG. 2 according to the present disclosure.

As shown in FIG. 5, the at least one fan 60 may be configured to draw a flow 68 of warm air proximate to the apparatus 12 into the heat pump compartment and across the evaporator 62. The evaporator 62 may be an evaporator coil that contains liquid refrigerant. In some embodiments, the CFC free refrigerant. For example, the refrigerant within the evaporator 62 may be environmentally friendly R426A. In some embodiments, the heat pump 14 may include at least one filter 72 proximate to the evaporator 62 such that the flow 68 of warm air is drawn through the at least one filter 72 before flowing through the evaporator 62. The evaporator 62 may capture heat energy in the flow 68 of warm air flowing therethrough or thereover and transfer at least some of the heat energy to the refrigerant within the evaporator 62. The flow 68 of warm air may thereby be cooled by the evaporator 62 (by the refrigerant within the evaporator 62). Cooling the flow 68 of warm air may cause vapor therein to condense into condensate 74, as shown in FIG. 5. The condensate 74 may be removed from the heat pump 14 and apparatus 12, such as being directed to a drain. As shown in FIGS. 2 and 5, the at least one fan 60 may exhaust 70 the cooled and dehumidified air from the heat pump 14 and the apparatus 12. In some embodiments, the exhaust 70 may be vented or otherwise directed exterior to the structure within the apparatus is located, such as into the environment.

In some embodiments, the at least one fan 60 may be configured to form a flow of air (e.g., flow 68 and/or exhaust flow 70) of at least about 250 CFM, or at least about 450 CFM. For example, at least one fan 60 may include two selectable modes of operation effectuating differing flow volumes. In some embodiments, the at least one fan 60 may be configured to form a flow of air (e.g., flow 68 and/or exhaust flow 70) greater than about 400 CFM.

The heat from the flow 68 of warm air that was transferred to the refrigerant within the evaporator 62 may cause the refrigerant to flow from the evaporator 62 as in the form of a gas, such as a high quality vapor mixture. As shown in FIG. 5, the warm gaseous refrigerant exiting from the evaporator 62 may flow or pass into a compressor 64 where the warm gaseous refrigerant is compressed. In some embodiments, compression of the warm gaseous refrigerant via the compressor 64 may increase the temperature of the refrigerant such that it becomes a superheated vapor or gas.

As shown in FIG. 5, the superheated vapor or gas refrigerant may flow to and through the condenser 66. The condenser 66 may be configured in a heat exchange relationship with the water stored in the tank 24 of the electric heating tank 16, as shown in FIGS. 2 and 5. For example, as shown in FIGS. 2 and 5 the condenser 66 may be in fluid communication with the relatively cold water stored in the tank via the cold water input tube 50. As also shown in FIGS. 2 and 5, the heat pump 14 may include a pump 76 coupled between the cold water input tube 50 and the condenser 66 and configured to draw the cold water from the tank 24 and through the condenser 66. As the superheated vapor or gas refrigerant also flows through the condenser 66, the condenser 66 may act as a heat exchanger between the refrigerant and the cold water to transfer heat energy from the superheated vapor or gas refrigerant to the cold water from the tank 24. As the pump 76 circulates the cold water from the tank 24 via the cold water input tube 50 through the condenser/heat exchanger 66, a continuous transfer of heat energy from the superheated refrigerant to the cold water may occur to heat the water. As also shown in FIGS. 2 and 5, this heated water way return to the tank 24 via the heated water outlet tube 52. For example, the heated water outlet tube 52 may be in fluid communication with the tank 24 and the condenser/heat exchanger 66 (i.e., the flow of the water through the condenser/heat exchanger 66), as shown in FIGS. 2 and 5.

As shown in FIG. 5, upon transferring heat energy to the water within the condenser/heat exchanger 66, the superheated refrigerant may cool and condense back to a liquid refrigerant, such as a saturated liquid refrigerant and/or high quality liquid vapor mixture refrigerant. This liquid refrigerant may exit the condenser/heat exchanger 66 and be directed to a throttling device and/or a purge valve. Upon exiting the throttling device and/or purge valve, the pressure and temperature of the liquid refrigerant may drop and flow to the evaporator 62 to repeat the process (evaporator 62, compressor 64 and condenser/heat exchanger 66) as a cycle, as shown in FIG. 5.

Referring again to FIG. 1, output water 20 that is heated by heating and storage apparatus 12 and supplied to the system may be directed through a pipe or any other pathway through the system 10. Such output pipe extending from the tank 16 may be non-threaded or threaded (e.g., externally or internally) and/or otherwise configured to couple piping or another fluid pathway to deliver the flow of heated output water 20 to a heating fixture or exchanger within a defined area to heat the defined area. In some embodiments, the output pipe extending from the tank 16 for the output water 20 may be within the range of about ¾ inch to about 1½ inches in diameter. In some embodiments, the output pipe extending from the tank 16 for the output water 20 may be fixedly or removably coupled to a pipe or other mechanism leading to a manifold 84 and/or reticulating pump 88. For example, the output pipe extending from the tank 16 for the output water 20 may be soldered or brazed to pipe or other mechanism leading to a manifold 84 and/or reticulating pump 88, or may be threadably coupled to pipe or other mechanism leading to a manifold 84 and/or reticulating pump 88. In some embodiments, the output piping extending from the tank 16 for the output water 20 may include a shutoff valve and an air bleeder or other mechanism (not shown) downstream of the shutoff valve configured to remove air flowing therethrough.

Similarly, the cool input water 18 that is returned into the tank 16 of the heating and storage apparatus 12 may be directed through a pipe or any other fluid pathway. Such input pipe extending into the tank 16 for the cool input water 18 may be non-threaded or threaded (e.g., externally or internally) and/or otherwise configured to couple piping or another fluid pathway to deliver the flow of cool input water 18 into the tank 16. In some embodiments, the input pipe extending from into the tank 16 for the cool input water 18 may be within the range of about ¾ inch to about 1½ inches in diameter. In some embodiments, the input pipe extending into the tank 16 for the cool input water 18 may be fixedly or removably coupled to a pipe or other mechanism leading from a manifold 84 and/or at least one heating fixture or exchanger. For example, the input pipe extending into the tank 16 for the cool input water 18 may be soldered or brazed to pipe or other mechanism leading from a manifold 84 and/or at least one heating fixture/exchanger, or may be threadably coupled to pipe or other mechanism leading from a manifold 84 and/or at least one heating fixture/exchanger. In some embodiments, the input pipe extending into the tank 16 for the cool input water 18 may include a shutoff valve and an air bleeder or other mechanism (not shown) downstream of the shutoff valve configured to remove air flowing therethrough.

The system 10 may be a closed loop system or cycle such that the system 10 utilizes the heated output water 20 to heat one or more defined areas or "zones," and returns the water as the cool input water 18 that is fed or directed back to the apparatus 12. As discussed above, the apparatus 12 may be configured to heat the returned cool input water 18 that via the heat pump 14 and/or the electric heating tank 16. The apparatus 12 may include one or more electrical power supply 78 to power the heat pump 14 (e.g., the pump 76 thereof), the electric heating tank 16 (e.g., at least one resistive electric heating element 40, 42 thereof), and/or other components or aspects of the apparatus 12 (e.g., temperature gauging mechanism 22, controller 28, thermistors 44, 46, etc.). The power supply 78 may be any electrical power supply, or may be a combination of differing power supplies. For example, the power supply 78 may be or include a grid-based electrical power supply. As another example, the power supply 78 may be or include a renewable energy electrical power supply, such as via an attached solar panel(s) or wind turbine(s).

As shown in FIG. 1, the system 10 may include a first union 80 proximate to the heated output water 20 and/or a second union 80 proximate to the cool input water 18. The first and/or second union 80 may be configured as a quick disconnect or mechanism that allows or provides for the heating and storage apparatus 12 to be easily and/or quickly removed or isolated (e.g., fluidly and/or physically isolated) from the remaining portions of the system 10, such as for replacement of the apparatus 12 or repair or maintenance of the apparatus 12 for example. In some embodiments, the first and second unions 80 may thereby be positioned immediately adjacent or proximate to the heated output water 20 and the cool input water 18, respectively.

As also shown in FIG. 1, the system 10 may include a first valve 82 proximate to the heated output water 20 and/or a second valve 82 proximate to the cool input water 18. The first and/or second valve 82 may be configured to selectively fluidly isolate the apparatus 12 from the adjacent portions of the system 10, such as for replacement of the apparatus 12 or repair or maintenance of the apparatus 12 for example. In some embodiments, the first and/or second valve 82 may be a ball valve. In some embodiments, the system 10 may include a first valve 82 downstream of the first union 80 proximate to the heated output water 20, and/or a second valve 82 upstream of the second union 80 proximate to the cool input water 18, as shown in FIG. 1.

The system 10 may be configured to utilize or distribute the heated output water 20 of the apparatus 12 to heat a single defined area or zone of a structure, or configured to heat a plurality of defined areas or zones of a structure. In a single zone arrangement, the heated output water 20 may be directed to one or more radiators or other heating fixtures or exchangers within the defined area that pass the heat energy therefrom into the defined area via at least one recirculating pump 88 and corresponding thermostat 90 as described further below. In a multiple zone arrangement, as shown in FIG. 1, the system 10 may include a manifold 84 in fluid communication with the heated output water 20 to receive and distribute the heated output water 20 to each of the plurality of zones 86A, 86B, 86C, etc. (i.e., is positioned downstream of the apparatus 12) and associate predefined areas 99A, 99B, 99C, etc. of a structure. In this way, the manifold 84 may be a pipe or other chamber that branches into several openings correspond to the plurality of zones 86A, 86B, 86C, etc. for directing the flow of the heated output water 20 therethrough. The more zones 86A, 86B, 86C, etc. the system 10 is configured to heat, the greater the volumetric flow rate of the heated output water 20 may need to be configured (and, potentially, the greater the volume of the tank 24 and/or the greater amount of BTUs the apparatus 12 may be configured to generate).

The output or distribution of the flow of the heated output water 20 from the manifold 84 in a multi-zone arrangement of the system 10, or the flow of the heated output water 20 from the first union 80 and/or first valve 82 in a single-zone arrangement of the system 10, may be controlled or dictated by a corresponding reticulating pump 88. For example, as shown in FIG. 1 each zone may include a dedicated or corresponding recirculating pump 88 in fluid communication with the corresponding opening or portion of the manifold 84 in a multi-zone arrangement. In a single zone arrangement, a recirculating pump 88 may be in fluid communication with the heated output water 20 and not include a manifold 84.

The recirculating pump(s) 88 of the system 10 may be configured to draw the heated output water 20 and circulate the heated output water 20 through the upstream portions of the system 10 (e.g., through at least one heating fixture or exchanger within a define area), as discussed further below, and, ultimately, back to the tank 24 of the apparatus 12 as the cool input water 18. In this way, the system 10 may form a closed loop or circuit of the heated output water 20. The recirculating pump(s) 88 may be any pump effective to draw the heated output water 20 from the tank 24 of the apparatus 12, and circulate the drawn heated output water 20 back to the tank 24 as the cool input water 18. Because recirculating pump(s) 88 may only circulate the water within the closed circuit, the recirculating pump(s) 88 may only need to overcome the friction of the system 10 (as opposed to lifting the water from a point of lower potential energy to a point of higher potential energy). In some embodiments, the recirculating pump(s) 88 of the system 10 may be a wet rotor circulator pump. In some such embodiments, the recirculating pump(s) 88 of the system 10 may be a centrifugal pump with a motor rotor, pump impeller, and support bearings combined and sealed within the water circuit. In some embodiments, the recirculating pump(s) 88 of the system 10 may be a variable speed pump. In some embodiments, the recirculating pump(s) 88 of the system 10 may be a temperature sensing and/or self adjusting variable speed pump. The at least one recirculating pump 88 may be surrounded by valves 82 (i.e., a valve 82 immediately downstream and immediately valve upstream 82) to selectively isolate the at least one recirculating pump 88, if needed.

As shown in FIG. 1, each recirculating pump 88 of the system 10 may be configured for on/off operation based on the temperature within the corresponding defined area or zone 86A, 86B, 86C, etc. that the particular recirculating pump 88 is configured to operate with. For example, as shown in FIG. 1 each defined area may include an associated thermostat 90 that detects or determines the temperature within the defined area. Each thermostat 90 may be selectively configured to setpoint temperature by the user such that the thermostat 90 sends a corresponding signal when the temperature within the defined area is below the setpoint temperature (or a differential therefrom) and a corresponding signal when the temperature within the defined area is above the setpoint temperature (or a differential therefrom). As also shown in FIG. 1, the system 10 may include a switching relay 91 associated with each thermostat and corresponding recirculating pump 88 to control the operation of the corresponding recirculating pump 88. In this way, the system 1 may be configured to utilize the thermostat 90 and relay 91 associated with each recirculating pump 88 to turn the corresponding recirculating pump 88 on and off according to the temperature within the defined area and the selected set point temperature. For example, a thermostat 90 determines or detects that the temperature within a particular defined area is below the setpoint temperature (or a differential therefrom), the thermostat 90 and associated relay 91 may turn on the associated recirculating pump 88 to draw the heated output water 20 from the tank 24 and through one or more heating fixture or exchanger of the particular zone and positioned within the particular defined area to heat the particular defined area. Similarly, as another example, if the thermostat 90 determines or detects that the temperature within a particular defined area is at or above the setpoint temperature (or a differential therefrom), the thermostat 90 and associated relay 91 may turn off the associated recirculating pump 88 to stop the heated output water 20 from recirculating and flowing through the one or more heating fixture or exchanger within the particular defined area of the associated zone 86A, 86B, 86C, etc.

The system 10 may include at least one gas removal mechanism 92 that removes or separates (e.g., automatically removes or separates) any air or other gaseous material that enters the system 10. For example, the system 10 may include at least one mechanism 92 that removes gases traveling through the system 10 within the recirculation loop of the heated output water 20 exiting the apparatus 12 to the cool input water 18 flowing back into the apparatus 12. Gases, such as air, may enter the system 10 or become trapped into the system in any number of ways, and may result in noise and/or pressure loss within the system 10. As explained further below, if the pressure of the water within the system 10 drops below a certain level, the at least one recirculating pump 88 may not be able to recirculate the heated output water 20. Further, the gas itself may foul the least one recirculating pump 88 such that it is unable to recirculate the heated output water 20. The at least one gas removal mechanism 92 of the system 10 may be any mechanism that separates out air or other gases from the water flowing through the system (i.e., the heated output water 20 and/or the cool input water 18) and, ultimately, removes the separated air or other gases from the system 10. The at least one gas removal mechanism 92 may be positioned upstream of the at least one recirculating pump 88 and downstream of the apparatus 12. In this way, the at least one gas removal mechanism 92 may remove air or other gases form the heated output water 20 prior to interacting with the at least one recirculating pump 88. However, the at least one gas removal mechanism 92, or an additional at least one gas removal mechanism 92, may be positioned downstream of the at least one recirculating pump 88 and upstream or downstream of the at least one heat exchanger or fixture. In some embodiments including multiple zones 86A, 86B, 86C, etc., the at least one gas removal mechanism 92 may be positioned upstream of the manifold 84 (and downstream of the apparatus 12). In some other embodiments, the system 10 may include at least one gas removal mechanism 92 for each zone 86A, 86B, 86C, etc. For example, the system 10 may include at least one gas removal mechanism 92 positioned downstream of the manifold 84 and upstream of the corresponding recirculating pump 88 for each zone 86A, 86B, 86C, etc.

As shown in FIG. 1, in some embodiments the at least one gas removal mechanism 92 of the system 10 may include an air scoop or separator that efficiently separates out air or other gases from the water flowing through the system (i.e., the heated output water 20 and/or the cool input water 18). The air scoop of the at least one gas removal mechanism 92 may be in fluid communication with water flowing through the system 10 such that the water flow through the air scoop. The air scoop may be installed such that at least about 18 inches of substantially horizontal piping is immediately before (upstream) the air scoop. In some embodiments, the air scoop may include a chamber or barrel that is configured to slow the velocity of the water (e.g., the heated output water 20 or the cool input water 18) and any gas flowing therethrough and thereby permitting the gas (e.g., air bubbles) to rise to the top portion of the chamber. In some embodiments, the chamber may include coalescing media or other media configured to collect and/or coalesce air or other gas to prevent the air or other gas from passing through the chamber. The air scoop may direct and collect the rising air or other gas in a top portion of the chamber. In some embodiments, the air scoop may include at least one baffle, vane or other mechanism that directs the gases to the top portion of the chamber. Air or other gases that reach and accumulate in the top portion of the chamber of the air scoop may be vented out of the air scoop and/or the system 10. For example, the top portion of the chamber of the air scoop may be in communication with a vent that ejects the separated and accumulated air or other gases into the atmosphere about the air scoop. In some such embodiments, the vent may be an automatic float-type air vent. In some other embodiments, the top portion of the chamber of the air scoop may be in communication with an expansion tank for the collection of the separated and accumulated gases therein, such as a conventional plain steel expansion tank. In such an embodiment, if the air or other gases completely fill the expansion tank and flow back down into the air scoop, the excess air or other gases may be removed from the system 10 by the valve without disturbing the operation of the system 10, for example.

As shown on FIG. 1, the system 10 may include at least one expansion tank 93, such as a diaphragm expansion tank. The at least one expansion tank 93 may be in fluid communication with the at least one gas removal mechanism 92, as shown in FIG. 1. However, the at least one expansion tank 93 may be in fluid communication with another portion of the system 10. The at least one expansion tank 93 may account or allow for thermal expansion of the water within the system 10, as the system 10 forms one or closed loops (i.e., is a closed loop system). The at least one expansion tank 93 may include a pre-pressurized tank with an air cushion or portion. When the water in the system 10 experiences a net temperature increase, the water may expand and flow into the pre-pressurized tank against the air portion (e.g., via a diaphragm) to compress the air to allow for such expansion. When the system 10 is opened or the net temperature of the water decreases, the water may leave the tank and returns to the system 10.

As also shown on FIG. 1, the system 10 maybe selectively fluidly coupled to a water supply 97 via a shut off valve 96, a back flow preventer 95 and a regulator or filler valve 94 of the system 10. The water supply 97, the shut off valve 96, the back flow preventer 95 and/or the regulator 94 may be in fluid communication with the at least one gas removal mechanism 92, as shown in FIG. 1. However, the water supply 97, the shut off valve 96, the back flow preventer 95 and/or the regulator 94 may be in fluid communication with another portion of the system 10. As shown in FIG. 1, the water supply 97, the shut off valve 96, the back flow preventer 95 and/or the regulator 94 may be in fluid communication with the system 10 between the at least one gas removal mechanism 92 and the expansion tank 93.

The water supply 97 may be a water supply that provides a flow of water at a pressure of at least about 12 psi, such as a domestic or municipal water supply for example. In some embodiments, the water supply 97 be at a pressure of at least about 18 psi. In some embodiments, the water supply 97 be at a pressure greater than the pressure of the water in the system 10. The shut off valve 96 may be any valve capable of being closed to isolate the water supply 97 from the system 10 (i.e., close the system 10). In an open position, the shut off valve 96 may couple the water supply 97 to the system 10 such that a flow of water is provide to the system 10, such as via the at least one gas removal mechanism 92. In some embodiments, the back flow preventer 95 may be postponed downstream of the water supply 97 and the shut off valve 96 and upstream of the expansion tank 93 and the at least one gas removal mechanism 92. However, the back flow preventer 95 may be positioned elsewhere in the system 10. The back flow preventer 95 may be prevented such that a flow of water is only able to flow therethrough in the direction of the system 10. As such, the flow of water from the water supply 97 may flow through the back flow preventer 95 and into the system 10, but the water contained in the system 10 may be prevented from flowing into the water supply 97 (and potentially toward the water supply 97). In some embodiments, the back flow preventer 95 may be a check valve or the like.

As shown in FIG. 1, the regulator or filler valve 94 of the system 10 may be in fluid communication with the water supply 97 and the system 10 when the valve 96 is open. For example, the regulator 94 may be in fluid communication with the at least one gas removal mechanism 92. However, the regulator 94 may be positioned elsewhere in the system 10. The regulator 94 may be configured to selectively introduce water from the water supply 97 into the system 10 and to maintain the pressure with the system 10 (e.g., maintain the water circulating through the system 10 pressurized). For example, the regulator 94 may be configured to maintain the pressure within the system 10 by introducing water from the water supply 97 when the pressure drops below a predetermined pressure. The pressure within the system 10 may decrease for any number of reasons. In some embodiments, the regulator 94 may utilize the pressure of the water supply 97 to create and maintain the pressure within the system 10 (i.e., create and maintain the pressure of the water circulating through the system 10), as the pressure of the water supply 97 may be greater than the pressure of the system 10. In some embodiments, the regulator 94 may be configured to pressurize the system 10 (by introducing water from the water supply 97) at least to about 12 psi. In some embodiments, the regulator 94 may be configured to pressurize the system at least to about 18 psi. In some embodiments, the regulator 94 may be configured to pressurize the system at a pressure within the range of about 12 psi and about 25 psi, or about 12 psi and about 18 psi.

In multi-zone embodiments, a gas removal mechanism 92, an expansion tank 93, a regular 94 (in fluid communication with the water supply 97) or combinations thereof may be in fluid communication with the system 10 downstream of the manifold 84 and associated with each zone 86A, 86B, 86C, etc. However, as shown in FIG. 1 the gas removal mechanism 92, expansion tank 93, and regular 94 (in fluid communication with the water supply 97) may be in fluid communication with the closed recirculating loop of water through the system 10 upstream of the outlet manifold 84 and pumps 88 and downstream of the apparatus 12. In some embodiments, the gas removal mechanism 92, expansion tank 93, and regular 94 (in fluid communication with the water supply 97) may be in fluid communication with the closed recirculating loop of water through the system 10 downstream of the outlet manifold 84 and pumps 88.

As shown in FIG. 1, the at least one recirculating pump 88 may selectively draw the output flow 20 of the heated water from the electric heating tank 16, pass the heated water 20 through the at least one heat exchange fixture associated with the particular zone 86A, 86B, 86C, etc. and positioned within the predefined area 99A, 99B, 99C of the particular zone 86A, 86B, 86C, etc. to heat the atmosphere thereof, and direct the then cool water back to the electric heating tank 14 as the cold input flow 18. It is noted that although the at least one recirculating pump 88 is depicted upstream of the predefined area(s) 99A, 99B, 99C, etc. (and thereby the associated heat exchange fixtures), the at least one recirculating pump 88 may be positioned downstream of the predefined area(s) 99A, 99B, 99C, etc. As shown in FIG. 1, in multi-zone configurations, after the heated water 20 flows or circulates through the predefined areas 99A, 99B, 99C, etc. and heat exchange fixtures (not shown) of the zones 86A, 86B, 86C, etc., a manifold 84 may recombine the flow of the cool water and form the cold input flow 18. As also shown in FIG. 1, in such embodiments each zone 86A, 86B, 86C, etc., may include a bleeder valve 98 configured to selectively allow at least air to bleed or escape from the associated zone, such as during filling of the zones 86A, 86B, 86C, etc. with water to prime the system 10.

As shown in FIG. 1, the system may include a plurality of sensors or gauges 89 configured to display or otherwise transit at least one characteristic or metric of the water circuiting through the system 10. For example, the gauges 89 may detect, and potentially display, temperature, pressure, flow rate, etc. of the water recirculating through the closed loops of the system 10.

In some embodiments, the heating and storage apparatus 12 may be configured or controlled such that both the heat pump 14 and the electric heating tank 16 (e.g., via the at least one resistive electric heating element 40, 42 thereof) heat the water within the tank 16 when its temperature drops below the defined minimum temperature by the temperature differential. As disclosed above, the defined minimum temperature and/or the temperature differential may be preprogrammed or nonadjustable, or alternatively user selectable. For example, the defined minimum temperature of the heating and storage apparatus 12 may preprogrammed or user selectable within the range of 140 degrees Fahrenheit and 180 degrees Fahrenheit, such as 150 degrees Fahrenheit, 160 degrees Fahrenheit or 170 degrees Fahrenheit, as described above.

As another example, the temperature differential of the heating and storage apparatus 12 may preprogrammed or user selectable within the range of a 2 degree Fahrenheit temperature differential and a 30 degree Fahrenheit temperature differential, within the range of a 5 degree Fahrenheit temperature differential and a 20 degree Fahrenheit temperature differential, or within the range of a 5 degree Fahrenheit temperature differential and a 15 degree Fahrenheit temperature differential. In some embodiments, the temperature differential of the heating and storage apparatus 12 may user selectable within a 30 degree Fahrenheit temperature differential, a 25 degree Fahrenheit temperature differential, a 20 degree Fahrenheit temperature differential, a 15 degree Fahrenheit temperature differential, or a 10 degree Fahrenheit temperature differential.

In some embodiments, the heating and storage apparatus 12 may include a plurality of temperature differentials. For example, the heating and storage apparatus 12 may monitor or determine the temperature of the water within an upper portion of the tank 16 (e.g., proximate to the relatively high heating element 42 and/or the outlet flow of heated water 20) and monitor or determine the temperature of the water within a lower portion of the tank 16 (e.g., proximate to the relatively low heating element 40 and/or the inlet flow of cool water 18), and, based on the defined minimum temperature and respective temperature differentials, operate the heat pump 14 and at least one of the relatively low and high resistive electric heating elements 40, 42 of the electric heating tank 16. For example, in one exemplary embodiment the heating and storage apparatus 12 may include an upper tank temperature differential between 5 degrees Fahrenheit and 15 degrees Fahrenheit, and a lower tank temperature differential between 2 degrees Fahrenheit and 15 degrees Fahrenheit (that is the same or different than the high temperature differential).

When the water within the tank 16 drops below the defined minimum temperature by the temperature differential (e.g., the temperature within the top portion of the tank 16 drops below the defined minimum temperature by the upper tank temperature differential and/or the temperature within the bottom portion of the tank 16 drops below the defined minimum temperature by the lower tank temperature differential), the heat pump 14 and the electric heating tank 16 (e.g., the respective upper and/or lower resistive electric heating element 40, 42) heat the water within the tank 16 until the defined minimum temperature or a defined temperature slightly above the defined minimum temperature (e.g., 5 degrees Fahrenheit or 10 degrees Fahrenheit over the defined minimum temperature). The heating and storage apparatus 12 may be configured or controlled such when the water within the tank 16 is heated by both the heat pump 14 and the electric heating tank 16 to the defined minimum temperature or the defined temperature slightly above the defined minimum temperature, the heat pump 14 and the electric heating tank 16 (i.e., the respective upper and/or lower resistive electric heating element 40, 42) stops or ceases to further heat the water. With the heat pump 14 and the electric heating tank 16 (i.e., the respective upper and/or lower resistive electric heating element 40, 42) not heating the water within the tank 16, the water is left to relatively slowly cool until it drops to a temperature below the defined minimum temperature by the respective temperature differential.

Example

A hot water or hydronic heating system 10 that was similar to the system 10 shown in FIG. 1 and described above was tested and analyzed in a residence. The system included a 50 gallon tank, the minimum temperature was set at 140 degrees Fahrenheit, and a baseboard room heating system was utilized as the heat exchange fixture. The performance data from the test indicated the ability of the system to maintain a comfortable room heating temperature of 68 degrees Fahrenheit despite significant changes in outdoor temperature. The system was configured to heat several thousand cubic feet of air within contiguously connected rooms, and operated on less than $1.92 per day utilizing conventional grid electricity.

A total of 68 readings of the system were taken over a 15 day period, thus averaging one reading every five hours. The readings were taken by the same person using visual observation. The separate readings were taken at 2 am, 7 am, 2 pm, 5 pm, and 10 pm respectively. A 663 square foot section of the 1,800 square foot residence was heated. The average outdoor temperature equaled 18 degrees Fahrenheit, whereas the indoor temperature remained 68 degrees Fahrenheit. The system thereby created a difference of 49 degrees Fahrenheit between the indoor and outdoor temperatures. The average humidity recorded during that time period was 51%.

An intermittently burning woodstove approximately 8 feet from the temperature/pressure instrumentation supplied heated water to an entirely separate part of the home. A correlation was not maintained during the 15 day period between the timing of woodstove use and the recording of the data. The pipe temperature to room as a dependent variable in relation to basement temperature and feedback gathered through thermostat heat demand changes remained primarily within a 20 degree (100 degrees Fahrenheit to 120 degrees Fahrenheit range. The average supply pipe temperature to the heated rooms were 111 degrees Fahrenheit, whereas the returning pipe temperature from the heated rooms was 85 degrees Fahrenheit (i.e., an average difference of 26 degrees Fahrenheit between the pipe temperature entering and leaving the heated rooms). The average water pressure of the system measured at a point prior to entering the heated rooms was 20 psi, whereas the average water pressure leaving the rooms was 19 psi (i.e., a difference of 1 psi).

A twenty two hour contiguous test of the system consumed 550 Watts of electricity while operating for fifteen of twenty two hours. This consumed 8.25 kWh of electricity costing $1.01@$0.12/KWH. A review of the residence's heating expenditures for the previous heating season indicated a three gallon use of oil equaling $9.90 per day. Assuming the cost to heat each segment of the residence is about equal, then $3.66 equates to the fractional residence heating oil cost of the heated rooms. Therefore, a cost savings of $2.65 for the initial twenty two hour period of measurement was achieved. This does not include, however, electricity used during the oil burner heating process.

The terminology used herein is for the purpose of describing particular embodiments only and is not intended to be limiting of the invention. As used herein, the terms "upstream" and "downstream" are used relative to the position of the heating and storage apparatus (i.e., the apparatus is considered the beginning or starting point of the flow of water) and in reference to the direction of the recirculating loop of water of the system. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods may be described herein.

As will be appreciated by one having ordinary skill in the art, the methods and compositions of the invention substantially reduce or eliminate the disadvantages and drawbacks associated with prior art methods and compositions.

As required, detailed embodiments of the present invention may be disclosed herein; however, it is to be understood that the disclosed embodiments may be merely exemplary of the invention, which may be embodied in various forms. Therefore, specific structural and functional details disclosed herein may be not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill aspects stated above, it will be appreciated that numerous modifications and other embodiments may be devised by one of ordinary skill in the art. Accordingly, it will be understood that the appended claims may be intended to cover all such modifications and embodiments, which come within the spirit and scope of the present invention.

I claim:

1. A hot water heating system for heating the atmosphere within at least one predefined area of a structure, comprising:
   a hybrid water heating and storage apparatus configured to store and heat water to a first temperature of at least 150 degrees Fahrenheit including a heat pump and an electric heating tank in fluid communication, the electric heating tank being positioned within an enclosure and storing the heated water;
   at least one heat exchange fixture positioned in at least one predefined area within the structure;
   at least one recirculating pump configured to selectively draw a hot output flow of the heated water from the electric heating tank, pass the heated water through the at least one heat exchange fixture to heat the atmosphere within the at least one predefined area, and direct the water back to the electric heating tank from the at least one heat exchange fixture as a cold input flow of a temperature less than a temperature of the hot output flow; and
   at least one thermostat electrically coupled to the at least one recirculating pump and positioned within the at least one predefined area configured to sense the temperature of the atmosphere within the at least one predefined area,
   wherein, in a hybrid mode of operation of the apparatus, the heat pump and the electric heating tank both heat the water when the temperature of the water decreases from the first temperature to a second temperature that is colder than the first temperature,
   wherein the at least one thermostat controls selective operation of the at least one recirculating pump based on a sensed temperature and a user selected temperature, and
   wherein the heat pump is configured to draw the water stored in the electric heating tank from a lower portion of the electric heating tank, heat the water drawn from the lower portion of the electric heating tank, and return the heated water directly to the lower portion of the electric heating tank via a singular flowpath that extends directly between the heat pump and the lower portion of the electric heating tank, the singular flowpath being positioned within the enclosure and exterior to the electric heating tank.

2. The system of claim 1, wherein the first temperature is within the range of 160 degrees Fahrenheit to 170 degrees Fahrenheit.

3. The system of claim 1, wherein the at least one recirculating pump is in fluid communication with at least one manifold that is in fluid communication with an outlet of the electric heating tank, the at least one manifold providing separate flowpaths from the electric heating tank to the at least one recirculating pump.

4. The system of claim 1, wherein the at least one heat exchange fixture is in fluid communication with at least one manifold that is in fluid communication with an inlet of the electric heating tank, the at least one manifold combining the flows of water from the at least one first heat exchange fixture into the cold input flow.

5. The system of claim 1, wherein the system forms a closed loop of recirculating water flowing from the apparatus as the hot output flow to the at least one heat exchange fixture, through the at least one heat exchange fixture, and from the respective at least one first heat exchange fixture back to the apparatus as the cold input flow.

6. The system of claim 5, wherein the system further comprises at least one at least one gas removal mechanism that is configured to remove gases from the closed loop of recirculating water.

7. The system of claim 5, wherein the system further comprises at regulator in fluid communication with a supply of water configured to pressurize the closed loop of recirculating water.

8. The system of claim 7, wherein the closed loop of recirculating water is pressurized within the range of 12 psi and 18 psi.

9. The system of claim 1, wherein the electric heating tank is configured to heat the water therein via at least one electric resistance element.

10. The system of claim 1, wherein:
    the at least one heat exchange fixture comprises a first heat exchange fixture positioned in a first predefined area within the structure, and a second heat exchange fixture positioned in a second predefined area within the structure;

the at least one recirculating pump comprises:
a first recirculating pump configured to selectively draw a hot output flow of the heated water from the electric heating tank, pass the heated water through the first heat exchange fixture to heat the atmosphere within the first predefined area, and direct the water back to the electric heating tank from the first heat exchange fixture as a cold input flow of a temperature less than a temperature of the hot output flow; and
a second recirculating pump configured to selectively draw a hot output flow of the heated water from the electric heating tank, pass the heated water through the second heat exchange fixture to heat the atmosphere within the second predefined area, and direct the water back to the electric heating tank from the second heat exchange fixture as a cold input flow of a temperature less than a temperature of the hot output flow; and
the at least one thermostat comprises a first thermostat electrically coupled to the first recirculating pump and positioned within the first predefined area configured to sense the temperature of the atmosphere within the first predefined area, and a second thermostat electrically coupled to the second recirculating pump and positioned within the second predefined area configured to sense the temperature of the atmosphere within the second predefined area.

11. The system of claim 10, wherein the first thermostat controls selective operation of the first recirculating pump based on a sensed temperature and a user selected temperature, and the second thermostat controls selective operation of the second recirculating pump based on a sensed temperature and the user selected temperature.

12. The system of claim 1, wherein the enclosure comprises a protective jacket that extends about the heat pump and the electric heating tank.

13. The system of claim 1, wherein the enclosure comprises at least one of a liner and insulation.

* * * * *